March 31, 1953

H. E. TEMPLE ET AL 2,633,258

AUTOMATIC OVEN UNLOADER

Filed Sept. 17, 1948

INVENTORS:
HIRAM E TEMPLE
GEORGE E. TENCH
BY THEIR ATTORNEYS
HARRIS, KIECH, FOSTER & HARRIS
BY

March 31, 1953     H. E. TEMPLE ET AL     2,633,258
AUTOMATIC OVEN UNLOADER
Filed Sept. 17, 1948     10 Sheets-Sheet 6
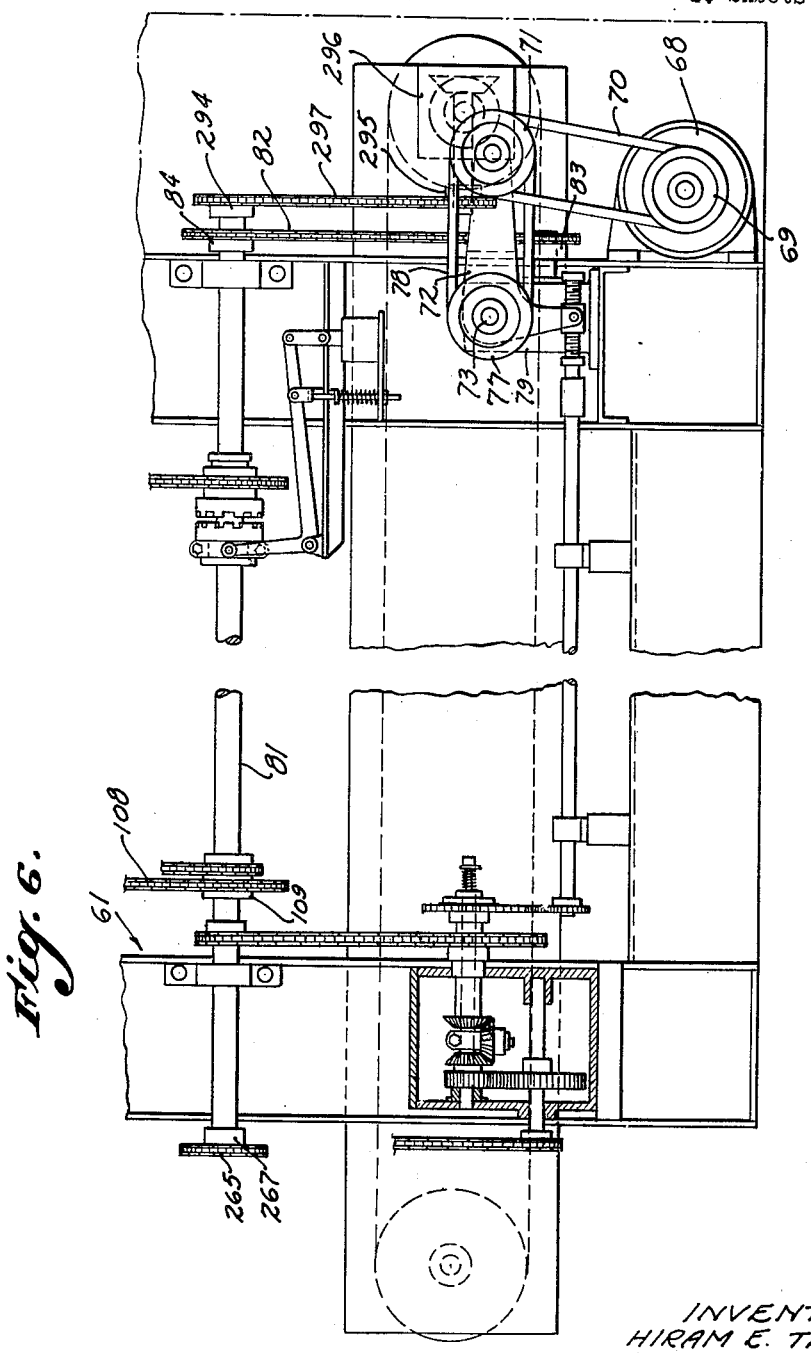
Fig. 6.
INVENTORS:
HIRAM E. TEMPLE
GEORGE E. TENCH
BY THEIR ATTORNEYS
HARRIS, KIECH, FOSTER & HARRIS
BY 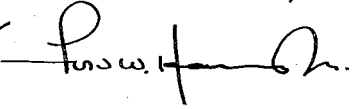

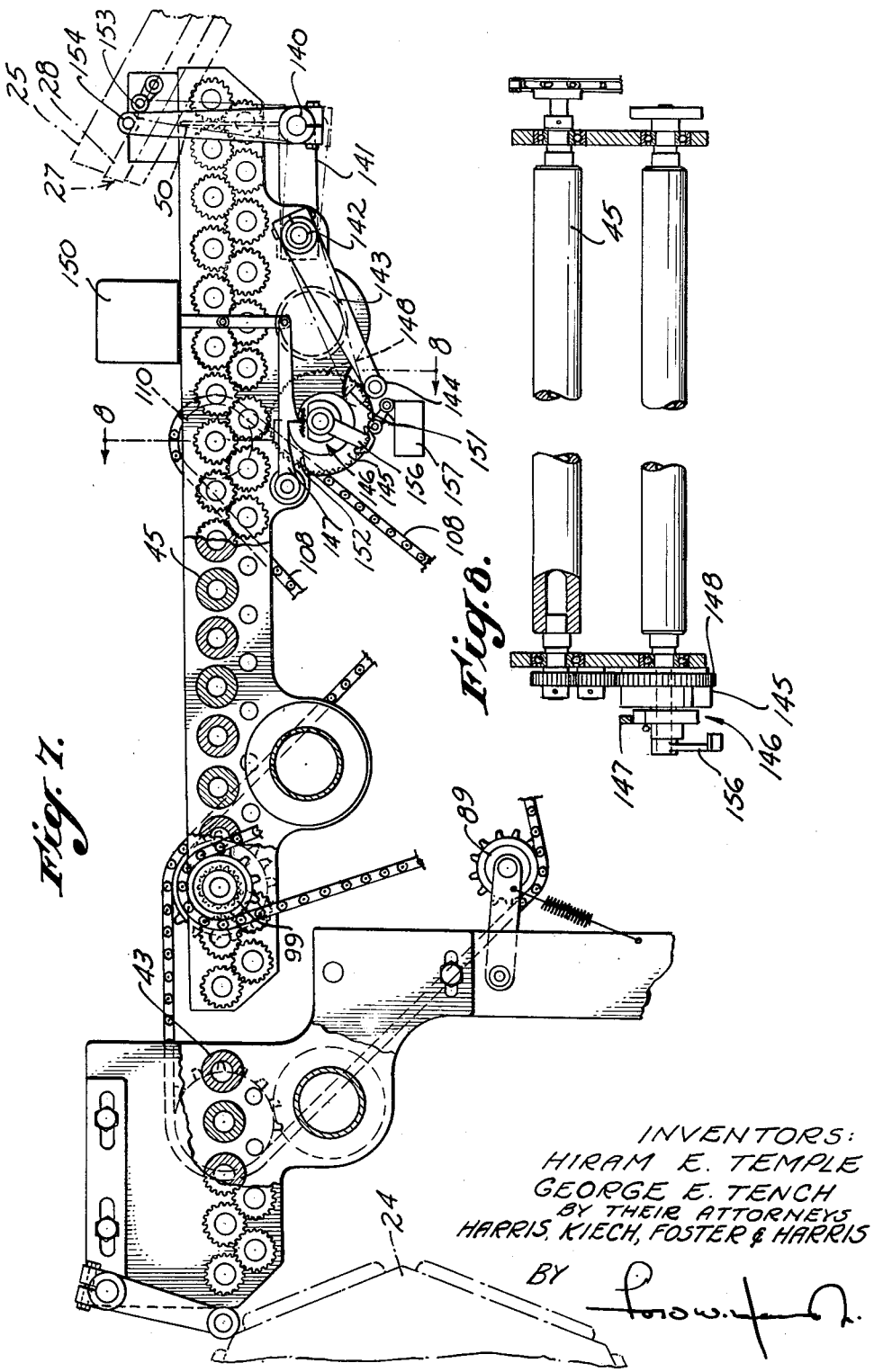

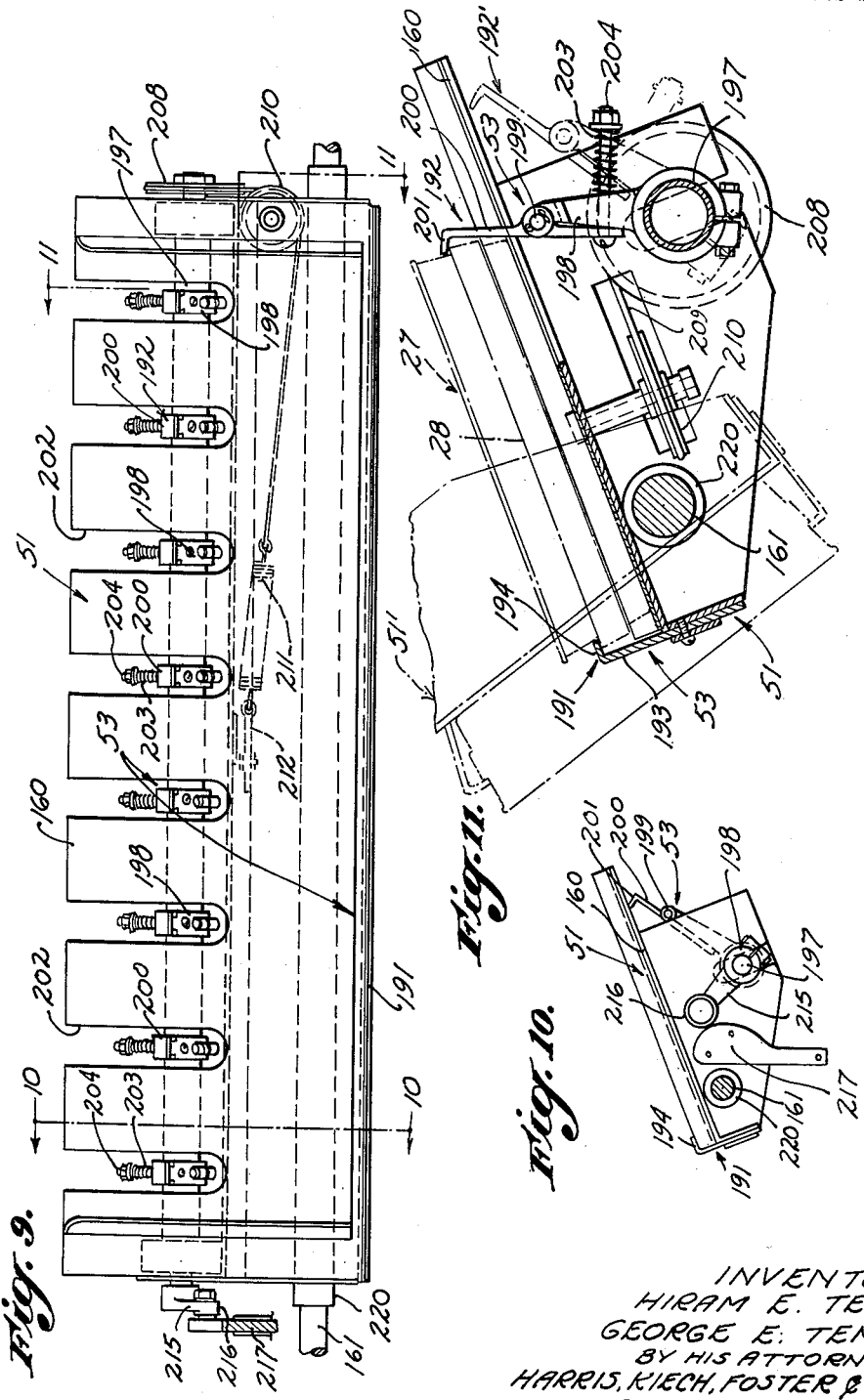

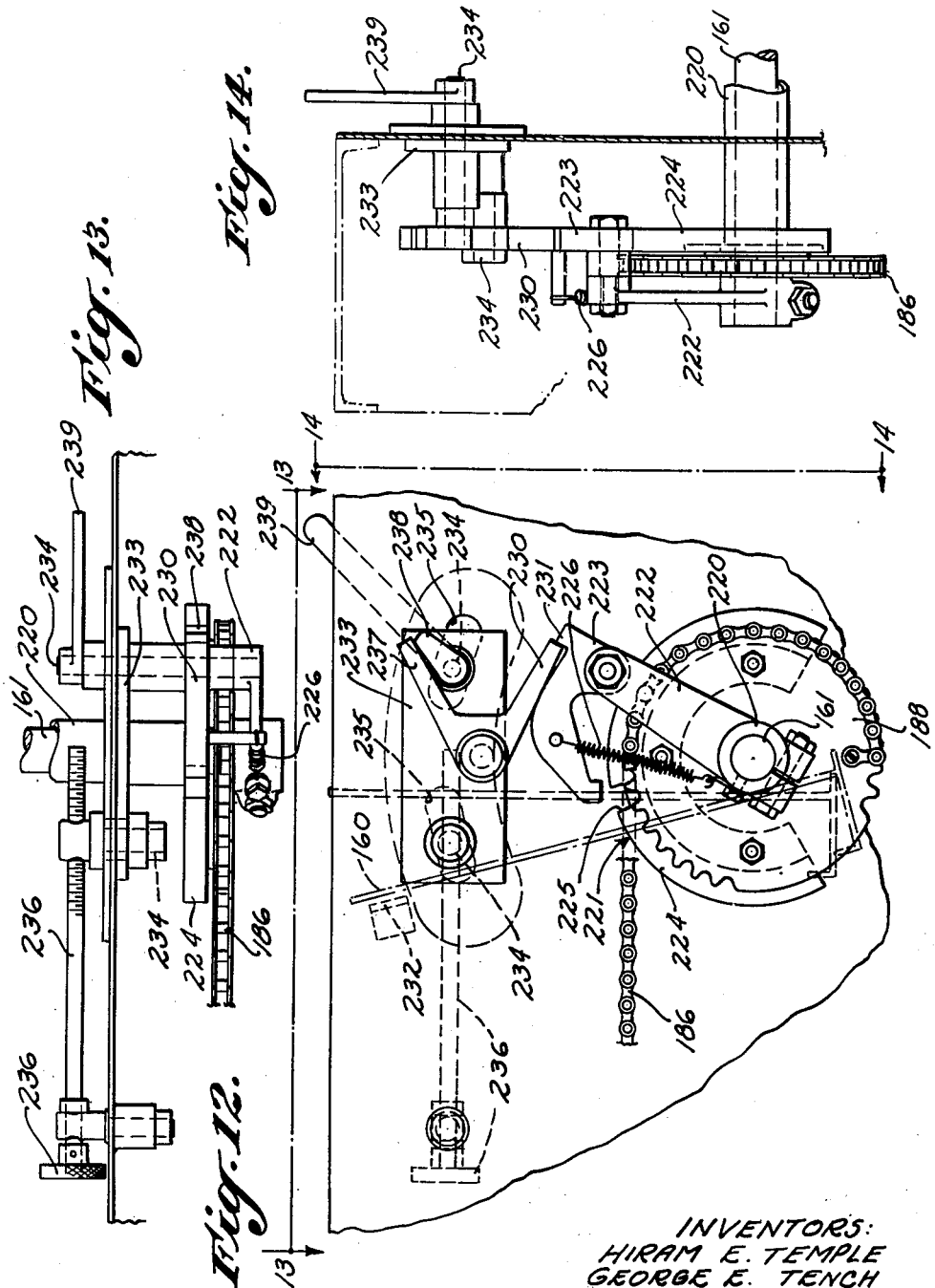

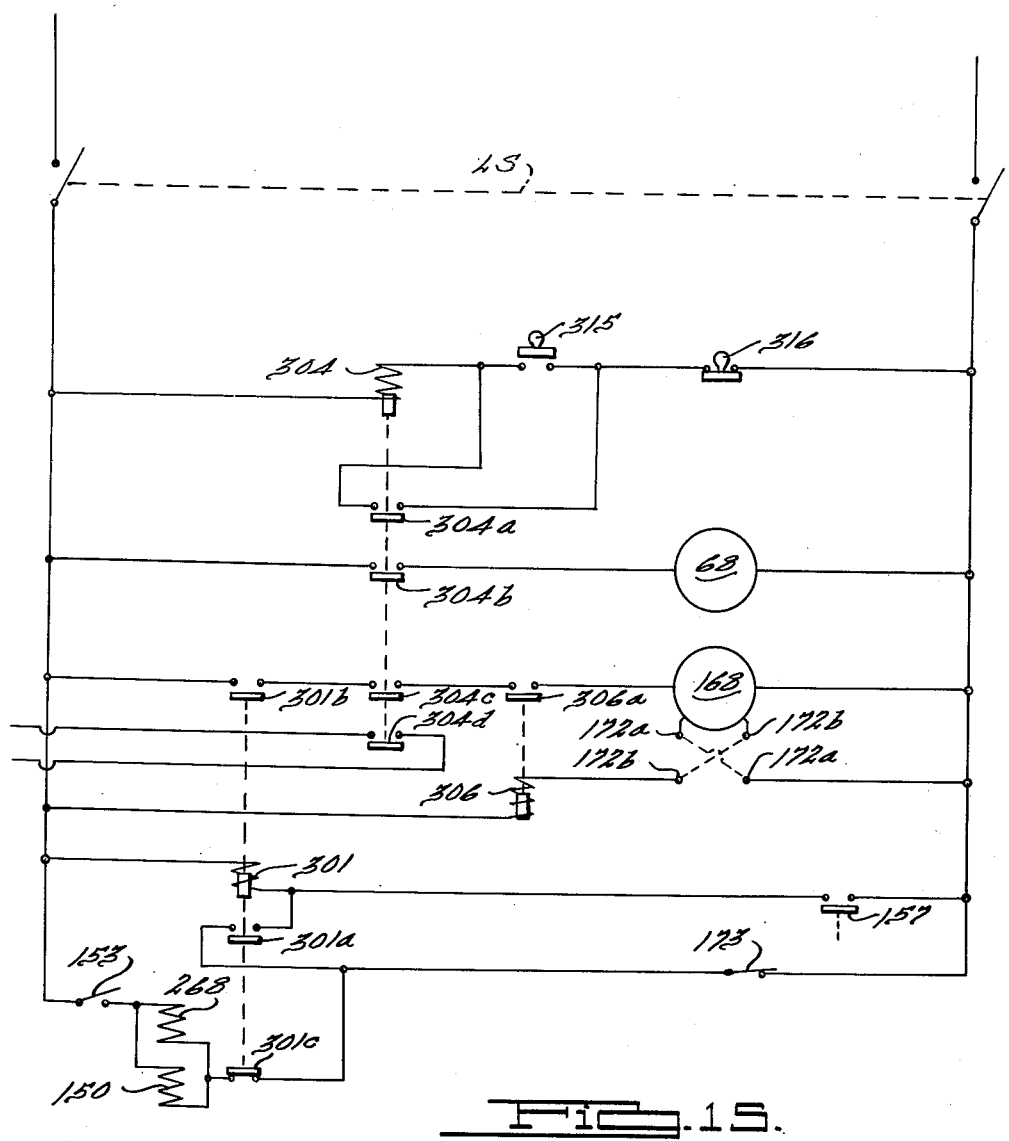

Patented Mar. 31, 1953

2,633,258

UNITED STATES PATENT OFFICE 2,633,258

AUTOMATIC OVEN UNLOADER

Hiram E. Temple, Los Angeles, and George E. Tench, South Pasadena, Calif., assignors, by mesne assignments, to Baker Perkins, Inc., New York, N. Y., a corporation of New York Application September 17, 1948, Serial No. 49,764

18 Claims. (Cl. 214—308)

Our invention relates in general to an apparatus for dumping the contents of containers and, since it has particular utility when embodied in apparatus for removing loaves of bread from the pans in which they are baked, we prefer to consider such embodiments herein for convenience However, it will be understood that the utility of the invention is independent of the particular field of application selected for consideration herein.

A primary object of our invention is to provide an automatic oven unloader which, at most, requires only the occasional supervision of one man so that this man may supervise the operation of several unloaders. Thus, substantial reductions in labor costs may be attained, which is an important feature of the invention.

An important object of our invention is to provide at the dumping station a rotatable dumping structure which receives the pan straps from the unloader conveyor as the gate at the outlet end of the unloader conveyor opens to release the straps, and which dumps loaves of bread from the pans and subsequently delivers the empty pan straps to the strap conveyor.

More specifically, an object is to provide a dumping structure which is rotatable in one direction from a loading position wherein it receives the pan straps to a first dumping position wherein it dumps the loaves of bread from the pan, and which is subsequently rotatable in the opposite direction from the first dumping position through the loading position to a second dumping position wherein it dumps the pan straps onto the strap conveyor.

An important object is to provide a dumping structure of the foregoing character which is inclined downwardly when it is in its second dumping position so that the pan straps may slide therefrom onto the strap conveyor.

Another object is to provide means carried by the rotatable dumping structure for holding the pan straps while the loaves of bread are being dumped and to provide means for causing the holding means to release the pan straps as the dumping structure rotates toward its second dumping position so as to permit the straps to slide onto the strap conveyor.

Another object is to provide delaying means for causing the dumping structure to remain in its second dumping position for a length of time sufficient to permit the pan straps to slide therefrom onto the strap conveyor.

An important object is to provide an unloader having stop means in the path of the dumping structure for decelerating such structure to rest substantially instantaneously as it reaches its first dumping position so as to loosen the loaves of bread from the pans and to cause them to fall therefrom into a suitable receiver.

Another object is to provide resilient means for causing the dumping structure to strike the stop means sharply so as to loosen the loaves of bread. A related object is to provide an apparatus wherein the dumping structure is driven through a clutch which is disengaged as this structure approaches its first dumping position to permit the aforementioned resilient means to cause the dumping structure to strike the stop means.

Still another object in this connection is to provide adjustable means for varying the point at which the aforementioned clutch is disengaged to vary the distance through which the dumping structure is rotated by the resilient means before striking the stop means, whereby to vary the degree of impact as the dumping structure strikes the stop means.

Another object is to provide an unloading apparatus wherein the aforementioned strap holding means includes a plurality of gripping elements which are adapted to engage the fluted or ribbed strap members encircling the straps of pans.

An important object of our invention is to provide resilient means for collectively urging the gripping elements into engagement with the pan straps and to provide additional resilient means for individually urging the gripping elements into engagement therewith. With this construction, the first resilient means mentioned in the preceding sentence accommodates pan straps of different lengths, and the second resilient means mentioned compensates for irregularities, such as dents, for example, in the pan straps, which is an important feature of the invention.

Another object is to provide an unloading apparatus wherein the loaves of bread are in generally inverted positions when they are dumped from the pans and to provide means disposed between the dumping structure and the receiver for the loaves of bread for causing the loaves to rotate about transverse axes thereof into substantially upright positions as they fall into the receiver.

Another object is to provide means for straightening the loaves of bread in the receiver and for moving them into contact with each other.

Another object is to provide the receiver for the loaves of bread with a normally closed gate and to provide means controlled by the cooling conveyor for opening this gate when the cooling conveyor is in the proper position to receive the loaves of bread.

Another object of the invention is to provide an electrical control system for the unloading apparatus which automatically causes the various events in its operating cycle to occur in their proper sequence.

Another object is to provide an electrical control system which, although it normally provides automatic control, may be adjusted to provide at least partial manual control if desired. For example, manual control may be desirable in the event that the apparatus is employed to unload pullman pans, i. e., pans having removable covers, from an oven to allow time for manual removal of the covers.

The foregoing objects and advantages of our invention, together with various other objects and advantages thereof which will become apparent, may be attained through the employment of the exemplary embodiments illustrated in the accompanying drawings and described detail hereinafter. Referring to the drawings:

Fig. 6 is a transverse sectional view taken along the broken lines 6—6 of Figs. 4 and 5 in the direction of the arrows intersecting such lines;

Fig. 7 is an enlarged, fragmentary sectional view taken approximately along the irregular broken line 7—7 of Fig. 2;

Fig. 8 is an enlarged, fragmentary sectional view taken along the irregular broken line 8—8 of Fig. 7;

Fig. 9 is an enlarged plan view of a rotary dumping structure which forms part of our unloading apparatus;

Fig. 10 is an enlarged sectional view taken in the direction of the arrows intersecting the broken line 10—10 of Fig. 9;

Fig. 11 is a further enlarged sectional view taken in the direction of the arrows intersecting the broken line 11—11 of Fig. 9;

Fig. 12 is an enlarged, fragmentary side elevational view duplicating a portion of Fig. 5 and illustrating in more detail a clutch through which the rotary dumping structure is driven;

Figure 1:
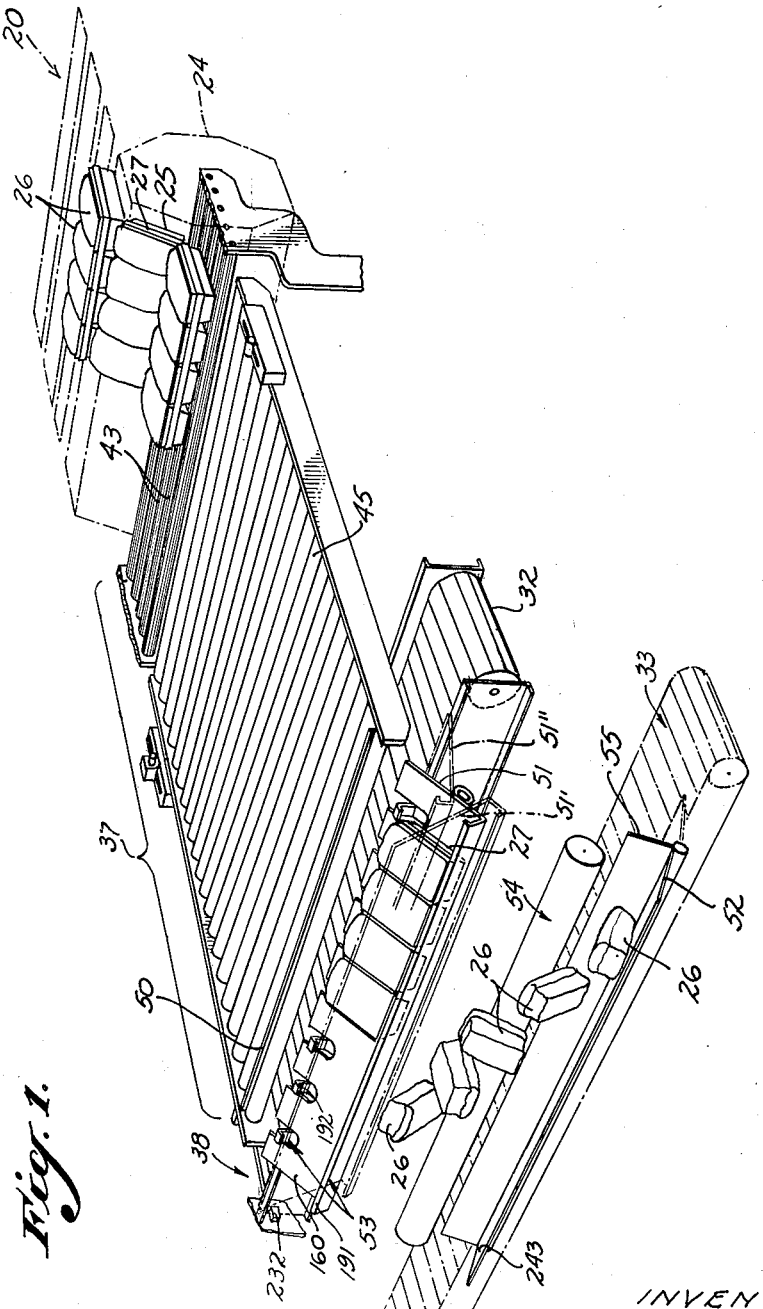
Fig. 1 is a semi-diagrammatic, perspective view showing the general structure of an oven unloading apparatus which embodies our invention and illustrating the general operation thereof, one embodiment of a cooling conveyor for the apparatus being illustrated in this view.
Figure 2:
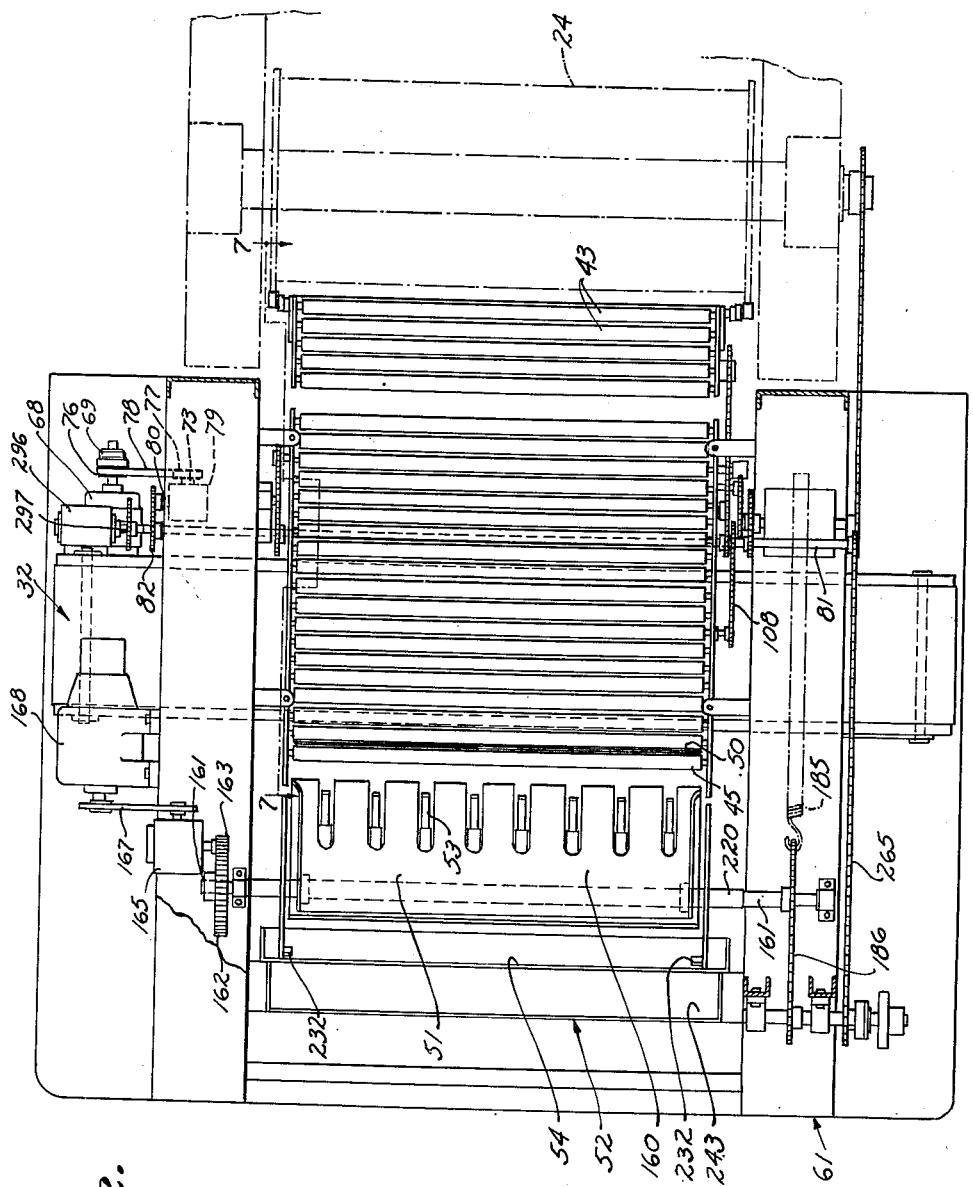
Fig. 2 is a plan view of the unloading apparatus.

Figs. 13 and 14 are enlarged, fragmentary views taken in the directions indicated by the arrows 13—13 and 14—14, respectively, of Fig. 12; and Fig. 15 is a schematic diagram illustrating an electrical control system for our unloading apparatus.

In large commercial bakeries, loaves of bread 26 are conventionally baked in pans of the type shown at 25. For convenience in handling, groups of pans 25 are encircled and held together by strap members 28 and these groups are commonly known as pan straps. The pan straps are here designated generally by the numeral 27 and each pan strap here shown consists of four pans each.

In operation, a continuous succession of pan straps 27 each containing baked loaves of bread 26 are discharged from an oven 20 onto a polygonal conveyer drum 24 which delivers them to a roller conveyer 37. The latter carries the pan straps 27 to a dumping station 38 where a mechanism 51 embodying the instant invention dumps the bread from the pans and delivers them to a receiver 52 having a gate 55 which opens at the proper moment in the operating cycle and permits the loaves of bread to slide onto an endless conveyer 33. The bread is then carried away by the conveyer for cooling. The emptied pans are deposited automatically on another conveyer 32 which carries them away for storage or refilling.

The roller conveyer 37 preferably is equipped with slow rollers 43 which receive the pan straps 27 from the conveyer drum 24 and fast rollers 45 which accelerate the pan straps to increase the spacing therebetween preparatory to deliver to the unloading apparatus of this invention.

Movement of the pan straps 27 to the dumping station 38 is controlled by a gate 50 of any suitable or conventional construction, and the gate is operated in any suitable manner in synchronism with the dumping mechanism so that the pan straps are delivered to the dumping mechanism at properly spaced intervals when the mechanism is positioned to receive them.

The pan strap gate 50

As best shown in Fig. 1 of the drawings, the gate 50 for intercepting the pan straps 27 as they arrive at the outlet end of the unloader conveyor 37 normally extends upwardly between the last two fast rollers 45, the gate being movable downwardly into a retracted position to permit passage of the pan straps at the proper moment. As best shown in Fig. 7 of the drawings, the gate 50 is carried by a transverse rod 140 which, in turn, is carried by arms 141 only one of which is visible in Fig. 7. The arms 141 are rigidly connected to a rotatable shaft 142 which extends transversely of the unloader.

Rigidly connected to the shaft 142 is an arm 143 which carries a cam follower 144, the latter engaging a cam 145 which normally holds the gate 50 in its extended position through the cam follower 144, the arm 143, the shaft 142, the arms 141 and the rod 140. The cam 145 is connected to a single revolution clutch 146 which is normally held disengaged by a pivoted catch 147. The single revolution clutch 146, which is of conventional construction and need not be described in detail, is driven by a gear 148 which is meshed with one of the gears interconnecting the fast rollers 45, as shown in Fig. 7 of the drawings. Connected to the pivoted catch 147 is a solenoid 150 which, when energized, swings the catch upwardly to permit engagement of the single revolution clutch 146, the manner in which the solenoid 150 is energized being discussed in more detail hereinafter.

Upon engagement of the single revolution clutch 146, the cam 145 is rotated in the clockwise direction, as viewed in Fig. 7 of the drawings, and permits the cam follower 144 to move upwardly into the position shown in phantom, thereby permitting the structure consisting of the arm 143, the shaft 142, the arms 141, the rod 140 and the gate 50 to rotate in the clockwise direction about the axis of the shaft 142 into the position shown in phantom in Fig. 7 so as to lower the gate 50 out of the path of pan straps on the unloader conveyor 37. The cam 145 is provided with an inwardly extending portion 151 which permits such upward movement of the cam follower 144 as the cam is rotated. The cam 145 is also provided with an outwardly extending portion 152 which is adapted to engage the cam follower 144 as the cam continues to rotate to return the gate 50 to its extended position after a line of pan straps 27 has moved therepast to the dumping station 38.

Considering the manner in which the solenoid 150 is energized to engage the single revolution clutch 146, connected in series with the solenoid is a switch 153 which is adapted to be closed by an arm 154 on the rod 140 carrying the gate 50 whenever a force of predetermined magnitude is applied to the gate 50 by pan straps 27 bearing thereagainst. For example, in an unloader designed to handle four pan straps abreast, it is preferable that at least three pan straps bear against the gate 50 before the arm 154 will be deflected enough to close the switch 153. As will be discussed in more detail hereinafter, provided that other switches in series with the solenoid 150 are closed, closure of the switch 153 results in energization of the solenoid 150 to release the single revolution clutch 146, whereupon it rotates the cam 145 to permit the gate 50 to drop into its retracted position to permit passage of the pan straps bearing thereagainst to the dumping station 38.

As shown in Fig. 7 of the drawings, an arm 156 is rigidly connected to the single revolution clutch 146 so as to be rotatable therewith and is adapted to actuate a switch 157 as the clutch 146 completes its single revolution. The function of the switch 157 will be discussed in more detail hereinafter.

As indicated in Fig. 7 of the drawings, as the center of gravity of each pan strap 27 moves past the center of the last of the fast rollers 45, the forward end thereof drops so that the gate 50 may be raised to intercept an oncoming pan strap before the preceding strap has moved completely off the unloader conveyor 37. This insures that two pan straps in series will not be delivered to the dumping station 38, which is a feature of our invention.

*The dumping structure 51*

Figure 3:
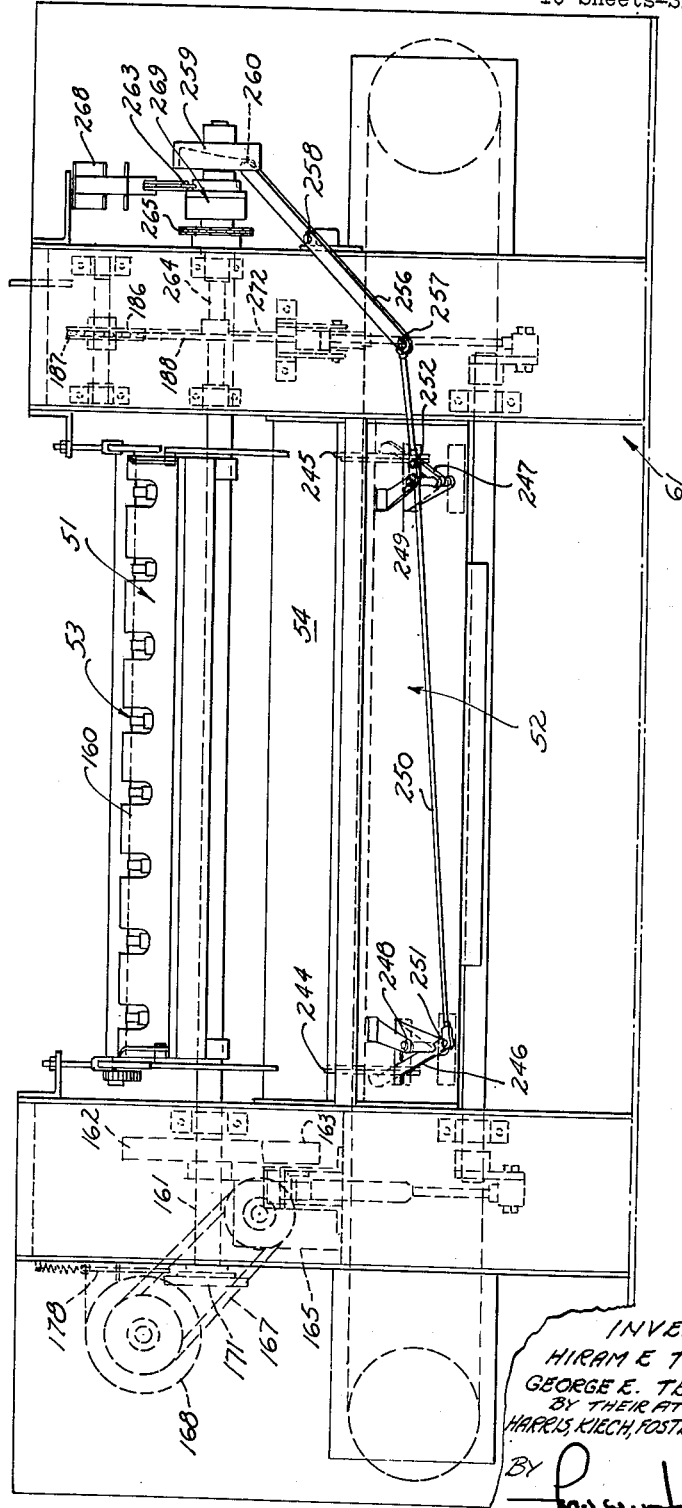
Fig. 3 is a front elevational view of the unloading apparatus.
Figure 4:
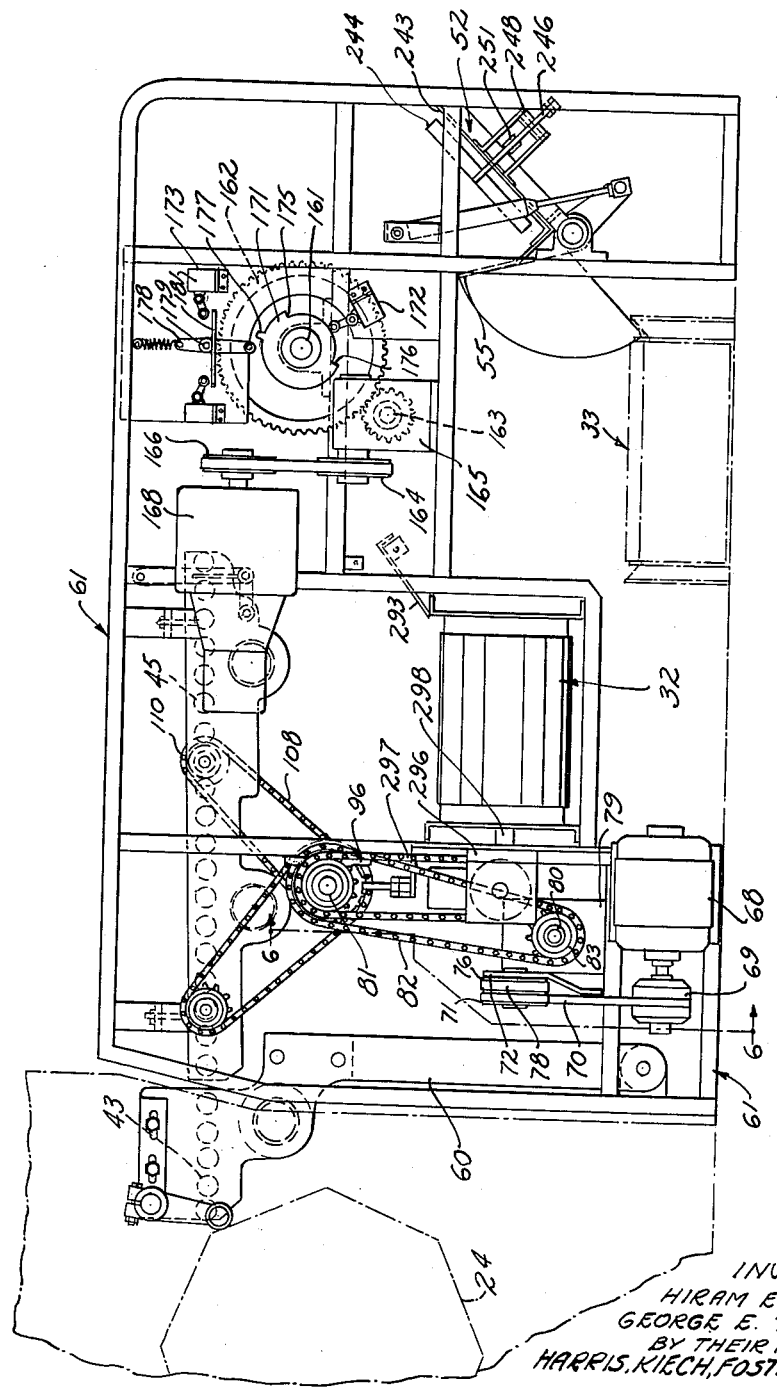
Fig. 4 is a side elevational view of the apparatus taken from the left.

In general, the dumping structure 51 comprises a platform or table 160 which is carried by a horizontal shaft 161, the latter, as best shown in Fig. 3 of the drawings, extending transversely of the unloader conveyor 37 and being journalled in suitable bearings connected to the frame 61 of the conveyor. As best shown in Figs. 3 and 4 of the drawings, a gear 162 is fixed on one end of the shaft 161 and is meshed with a gear 163 which is driven from a pulley 164 through gearing (not shown) contained in a gear box 165. Aligned with the pulley 164 is a pulley 166 which drives the pulley 164 through a belt 167, the pulley 166 being mounted on the shaft of a reversible electric motor 168.

At the proper moment in the operating cycle of the unloader apparatus, the reversible motor 168 first rotates the dumping structure 51 from its loading position to its first dumping position 51′, then rotates the dumping structure from its first dumping position through its loading position to its second dumping position 51″, and thereafter returns the dumping structure from its second dumping position to its loading position to complete the operating cycle thereof.

Figure 5:
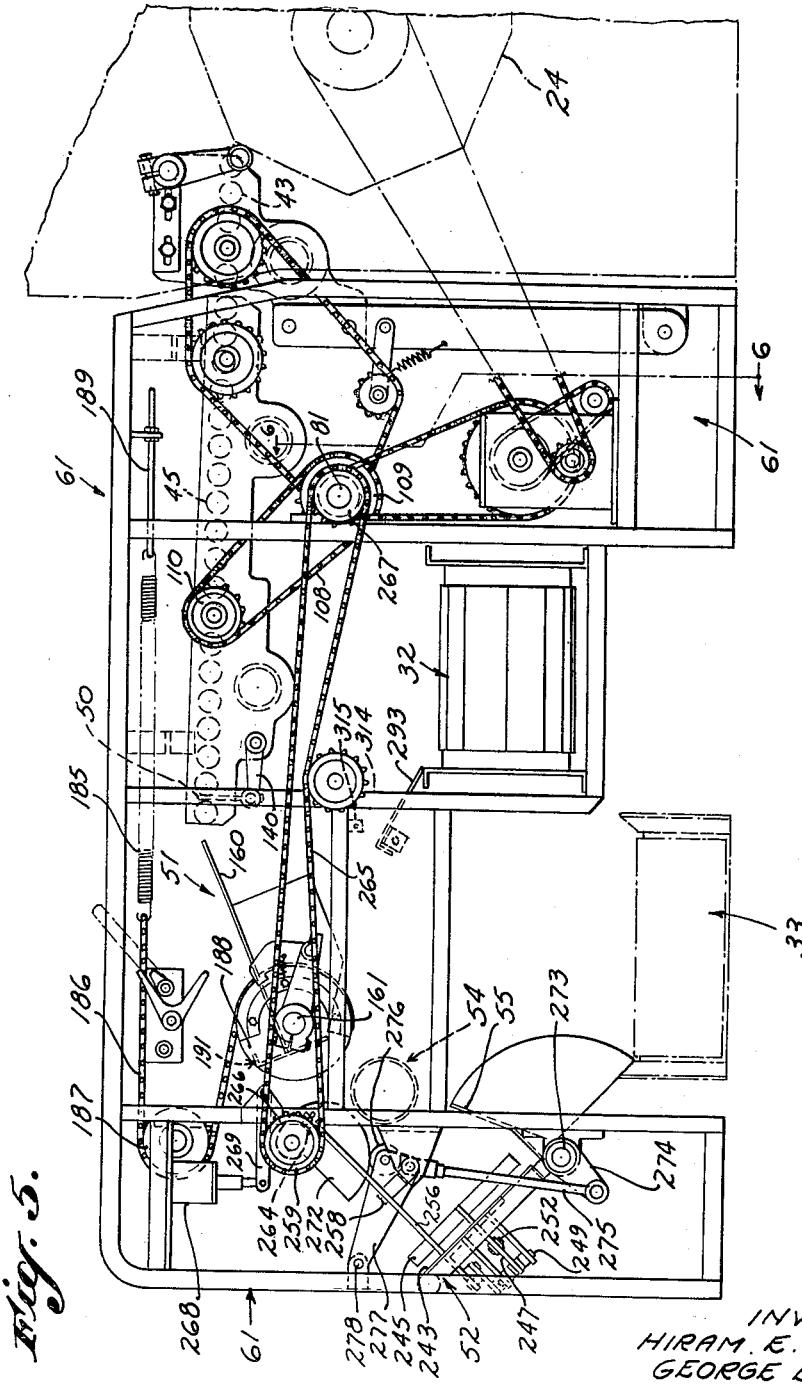
Fig. 5 is a side elevational view of the apparatus taken from the right.

When the dumping structure 51 is in its loading position, the table 160 thereof is inclined upwardly toward the outlet end of the unloader conveyor 37, as best shown in Fig. 5 of the drawings, so that a line of pan straps 27 released by retraction of the gate 50 may slide onto the table from the unloader conveyor. As best shown in Fig. 11 of the drawings, when the dumping structure 51 is in its first dumping position 51′, the table 160 is inclined upwardly and is generally inverted to permit the loaves of bread to fall from the pans held on the table by the holding means 53. When the dumping structure 51 is in its second dumping position 51″, the table 160 is inclined downwardly toward the strap conveyor 32, as best shown in Fig. 1 of the drawings, to permit the empty pan straps to slide from the table onto the strap conveyor, the holding means 53 being adapted to release the pan straps as the dumping structure rotates toward its second dumping position as will be discussed in more detail hereinafter.

The operation of the reversible motor 168 driving the dumping structure 51 is regulated by switches in the electrical control system of the unloading apparatus 21, some of these switches being shown in Fig. 4 of the drawings. Referring thereto, connected to the shaft 161 carrying the table 160 is a cam 171 which is adapted to operate switches 172 and 173, the cam having radial shoulders 175 and 176 which are adapted to operate the switch 172 as the cam rotates, and having a radial projection 177 which is adapted to operate the switch 173 as the cam rotates. The switch 172 is a reversing switch which is actuable by the shoulder 175 on the cam 171 to reverse the direction of rotation of the dumping motor 168 when the dumping structure 51 reaches its first dumping position 51′ so that the motor will reverse the direction of rotation of the dumping structure to rotate it from its first dumping position through its loading position to its second dumping position 151″. When the dumping structure 51 reaches its second dumping position, the shoulder 176 on the cam 171 actuates the reversing switch 172 to again reverse the direction of rotation of the motor 168, whereupon the latter reverses the direction of rotation of the dumping structure and returns it from its second dumping position to its loading position.

The radial projection 177 is adapted to actuate the switch 173 through a spring loaded cruciform member 178 which is pivoted at 179, the member 178 having an arm 181 which is adapted to actuate the switch 173. As the dumping structure rotates toward its second dumping position 51″, the radial projection 177 on the cam 171 moves past and disengages the cruciform member 178. Subsequently, as the dumping structure 51 is returned from its second dumping position 51″ to its loading position, the cam 171 is rotated in the clockwise direction, as viewed in Fig. 4 of the drawings, and the radial projection 177 thereon engages the cruciform member 178 to cause the arm 181 thereof to actuate the switch 173, the latter being a limit switch which stops the motor 168 as the dumping structure is returned to its loading position. In causing the cruciform member 178 to actuate the limit switch 173, the radial projection 177 on the cam 171 moves past the cruciform member into the position shown in Fig. 4 of the drawings and disengages same.

The operation of the various switches controlling the reversible electric motor 168 will be considered in more detail hereinafter in connection with a discussion of the electrical control system of the unloading apparatus 21.

The dumping structure 51 is biased toward its first dumping position 51' by a balancing spring 185 as best shown in Fig. 5 of the drawings. Connected to one end of the balancing spring is a chain 186 which is trained over an idling sprocket 187 and which is trained around and anchored to a sprocket 188, the latter being rigidly connected to and rotatable with the table 160 of the dumping structure. Connected to the opposite end of the balancing spring 185 is an adjusting rod 189 for varying the tension in the balancing spring and, as a result, the biasing force applied to the table 160 through the chain 186 and the sprocket 188. It will be apparent that since the spring 185 biases the dumping structure 51 toward its first dumping position 51', it acts as a balancing means to compensate for the weight of a line of pan straps 27 on the table 160 when the dumping structure is in its loading position so as to reduce the power required of the reversible motor 168 when the latter rotates the dumping structure toward its first dumping position, which is a feature of the invention. The balancing spring 185 also performs another important function which will be discussed in detail hereinafter.

*The strap holding means 53*

Referring particularly to Fig. 11 of the drawings, the holding means 53 comprises a fixed gripping structure 191 which is adapted to engage the forward end of a pan strap 27 on the table 160 of the dumping structure 51, and comprises a rotatable gripping structure 192 which is adapted to engage the rearward end of the pan strap, the gripping structure 192 being rotatable from a retracted position, which is shown in phantom in Fig. 11 of the drawings and which is indicated by the numeral 192', to an extended position, which is shown in solid lines in Fig. 11, wherein it engages the rearward end of the pan strap.

Considering the holding means 53 in more detail, the fixed gripping structure 191 comprises a wall 193 which is located at the forward end of the table 160 and which is provided with a rearwardly directed flange or lip 194. The wall 193 acts as a stop and as a final aligning means for the pan straps 27 as they slide downwardly onto the table 160 from the unloader conveyor 37 with the dumping structure 51 in its loading position. The lip 194 on the wall 193 is adapted to hook over the upper edge of the strap member 28 interconnecting the pans 25 of each pan strap 27, as clearly indicated in Fig. 11 of the drawings. Although the lip 194 is shown as adapted to hook over the upper edge of the strap member 28, if a ribbed or fluted strap member is employed as is customarily the case, the lip 194 may be designed to hook over one of the ribs of the strap member.

The rotatable gripping structure 192 includes a horizontal shaft 197 which extends transversely of the unloading apparatus the full length of the dumping structure 51 and which is rotatable relative to the table 160 of the dumping structure. Clamped on the shaft 197 are brackets 198 each of which has pivotally connected thereto at 199 a gripping element 200. The gripping elements 200 are provided with forwardly directed lips 201 which are adapted to hook over the upper edge of a strap member 28 interconnecting the pans 25 of a pan strap 27 at the rearward end of the pan strap, as clearly indicated in Fig. 11 of the drawings. As is the case with the lips 194 of the fixed gripping structure 191, the lips 201 of the pivoted gripping elements 200 may be designed to hook over a rib on the strap member 28 if pan straps 27 incorporating fluted or ribbed strap members are employed.

The gripping elements 200 are rotatable into engagement with a line of pan straps 27 on the table 160 as the gripping structure 192 rotates from its retracted position 192' to its extended position, the table 160 being provided with notches 202 therein to permit extension of the gripping elements 200 into engagement with the pan straps. As best shown in Fig. 11 of the drawings, the gripping elements 200 are individually urged into engagement with the pan straps on the table 160 by compression springs 203, each of the latter being retained by a bolt 204 which extends through the corresponding gripping element and the bracket 198 on which it is mounted in a manner clearly shown in Fig. 11. The purpose of the springs 203 is to compensate for any irregularities, such as dents, or the like, in the rearward end of the pan straps 27. If a dent in one of the pan straps is present opposite one of the gripping elements 200, its spring 203 will move such gripping element further forward, i. e., will rotate such gripping element in the counterclockwise direction as viewed in Fig. 11 of the drawings, to insure engagement thereof with the pan strap, which is an important feature of the invention. Similarly, if a bump is present on one of the pan straps opposite one of the gripping elements 200, its spring 203 will permit pivoting of such gripping element in the clockwise direction, as viewed in Fig. 11 of the drawings, to accommodate the bump. We have found that the springs 203 are preferably designed to permit, for example, approximately a one inch travel of the lips 201 of the gripping elements to accommodate pan strap irregularities of, for example, approximately plus or minus one-half inch. However, the springs 203 may be designed to accommodate greater or lesser irregularities if desired.

In addition to being individually spring loaded in the foregoing manner, the gripping elements 200 are collectively spring loaded in a manner about to be described. As best shown in Fig. 9 of the drawings and as shown in phantom in Fig. 11 thereof, a pulley 208 is fixed on the shaft 197 carrying the pivoted gripping elements 200. Trained over the pulley 208 and anchored thereto is a cable 209 which is trained over an idling pulley 210 and connected to a tension spring 211, the latter being anchored by means of an adjusting rod 212 which permits varying the tension in the spring. As will be apparent, the spring 211 biases the gripping structure 192 toward its closed position, i. e., it biases the gripping structure 192 in the counterclockwise direction, as viewed in Fig. 11 of the drawings, into engagement with the pan straps on the table 160. Provision of the spring 211 permits use of our unloading apparatus 21 with pans 25 of different lengths without any necessity for adjustment of any component of the apparatus, which is an important feature of the invention. In other words, a line of pan straps 27 comprising short pans 25 may be followed by a line of pan straps comprising long pans without any necessity for adjusting the apparatus, such a difference in pan lengths being compensated for by the spring 211. However, it will be understood that a given line of pan straps cannot contain straps comprising both long and short pans. We have found that the spring 211 may be designed to compensate for variations throughout a range of pan lengths of, for example, eight inches to fifteen inches, although the apparatus may be designed to handle greater or lesser pan length ranges as desired.

It will thus be apparent that the individual springs 203 compensate for variations in length of pans of a given size while the spring 211 which acts on the gripping elements collectively compensates for variations in pan lengths resulting from the presence of pans of different sizes.

Considering the manner in which the gripping structure 192 is rotated from its opened position to its closed position and vice versa, and referring particularly to Figs. 9 and 10 of the drawings, the shaft 197 of the gripping structure 192 has an arm 215 fixed thereon. Rotatably mounted on the arm 215 is a cam follower 216 which engages a cam 217 carried by the frame 61 of the unloading apparatus. The cam 217 is adapted to permit the spring 211 to rotate the gripping structure 192 into its closed position as the dumping structure 51 is rotated from its loading position toward its first dumping position 51', and is adapted to cause the cam follower 216 to rotate the gripping structure 192 from its closed position into its opened position as the dumping structure is rotated from its first dumping position toward its second dumping position 51''. Preferably, the cam 217 permits the spring 211 to close the gripping structure 192 shortly after the dumping structure 51 begins to rotate from its loading position toward its first dumping position to insure engagement of the gripping elements 200 with the pan straps 27 on the table 160 before the table reaches a vertical position. Also, the cam 217 is preferably adapted to open the gripping structure 192 before the table 160 reaches a horizontal position as the dumping structure 51 is rotated from its first dumping position toward its second dumping position so that the empty pan straps on the table may begin to slide therefrom onto the strap conveyor 32 after the table 160 passes through such horizontal position in approaching the second dumping position. As will be discussed in more detail hereinafter, the electrical control system for the unloading apparatus includes delaying means in circuit with the reversible motor 168 for causing the dumping structure 51 to remain in its second dumping position 51'' for a length of time sufficient to permit all of the empty pan straps to slide from the table 160 onto the strap conveyor 32.

Thus, as the dumping structure 51 rotates from its loading position toward its first dumping position 51', the gripping structure 192 is closed to hold the pan straps 27 on the table 160 as the loaves of bread are dumped and, as the dumping structure is rotated from its first dumping position toward its second dumping position 51'', the gripping structure 192 is opened to permit the empty pan straps to slide onto the strap conveyor 32.

*Impact means for loosening the loaves 26*

As previously indicated, our unloading apparatus includes means for decelerating the dumping structure 51 to rest suddenly as it reaches its first dumping position 51' so as to jar the loaves of bread loose from the pans 25. Referring to Fig. 5 of the drawings and particularly to Figs. 12 to 14 thereof, the dumping structure 51 includes a tube 220 which is rotatable on the shaft 161 carrying the dumping structure and to which the table 160 is rigidly connected, the tube 220 normally being locked to the shaft 161 by a clutch 221. The latter includes an arm 222 which is fixed on the shaft 161 and which has pivotally connected thereto a spring loaded pawl 223. Fixed on the tube 220 so as to be rotatable with the table 160 of the dumping structure is a member 224 having a notch 225 therein for the pawl 223, the latter normally being held in the notch by a spring 226. Thus, when the pawl 223 is disposed in the notch 225, the dumping structure 51 is locked to the shaft 161 so as to rotate therewith when the shaft is driven by the reversible motor 168 in the manner hereinbefore described.

Positioned adjacent the clutch 221 is a clutch disengaging element 230 which is adapted to engage a projection 231 on the pawl 223 to rotate the latter out of the notch 225, thus disengaging the dumping structure 51 from the shaft 161. The clutch disengaging element 230 is so located that it disengages the clutch 221 before the dumping structure reaches its first dumping position 51'.

Upon disengagement of the clutch 221 by the element 230, the previously discussed balancing spring 185 causes the dumping structure 51 to accelerate until it strikes a stop 232, the latter serving as a means for decelerating the dumping structure to rest suddenly as the dumping structure reaches its first dumping position so as to jar the loaves of bread loose from the pans 25. Preferably, the balancing spring 185 is adapted to rotate the dumping structure 51 at a considerably higher speed than the motor 168 so that a greater jarring force is applied to the loaves to loosen them than would be the case if the motor were permitted to rotate the dumping structure against the stop 232, which is an important feature of the invention.

Preferably, the position of the clutch disengaging element 230 is adjustable so as to permit varying the distance from the first dumping position of the point at which the clutch 221 is disengaged to permit the spring 185 to take over. In the particular construction illustrated, this is accomplished by mounting the clutch disengaging element 230 on a bracket 233 which is connected to a portion of the frame 61 of the unloading apparatus by bolts 234, the latter extending through arcuate slots 235 in the frame to permit movement of the bracket 233 about the axis of rotation of the dumping structure. The position of the bracket 233 may be varied by means of a thumb screw 236 threaded through an end of one of the bolts 234.

It will be apparent that by varying the position of the clutch disengaging element 230 in the foregoing manner to vary the distance through which the dumping structure 51 is rotated by the balancing spring 185, the degree of impact attained as the dumping structure strikes the stop 232 may be varied so as to apply any desired jarring force to the loaves of bread to loosen them. Thus, if a large jarring force is desired, the clutch disengaging element 230 may be moved to the right, as viewed in Fig. 12 of the drawings, and if a smaller jarring force is desired, the element 230 may be moved to the left, as viewed therein.

Since, in some instances, it may be desirable to apply to the loaves of bread only the jarring force attainable through rotation of the dumping structure 51 into engagement with the stop 232 by the motor 168, we prefer to make the clutch disengaging element 230 movable relative to the bracket 233 into a position such that it will not engage the projection 231 on the pawl 223 to disengage the clutch 221. For this purpose, the clutch disengaging element is preferably pivotally connected to the bracket 233 and is provided with an arm 237 which is engageable by an eccentric 238 to rotate the element 230 out of position to disengage the clutch 221. The eccentric 238 is preferably mounted on one of the bolts 234 and a handle 239 for operating the eccentric is also mounted on the same bolt. Thus, by moving the handle 239, an operator of the apparatus may prevent disengagement of the clutch 221 so as to prevent rotation of the dumping structure 51 by the balancing spring 185.

The loaf righting means 54

Referring particularly to Fig. 1 of the drawings, the loaf righting means 54 comprises a cylinder which extends horizontally across the unloading apparatus and which is located below and forward of the first dumping position 51' of the dumping structure 51. The loaf righting cylinder 54 is located above and rearwardly of the receiver 52, the relationship between the positions of the receiver 52, the loaf righting cylinder and the dumping structure 51 being shown best in Fig. 5 of the drawings.

Again referring particularly to Fig. 1, when the dumping structure 51 strikes the stop 232 to loosen the loaves of bread from the pans, the loaves are thrown forwardly somewhat and are inclined upwardly and forwardly, as indicated by the leftmost loaf above the receiver 52. The loaf righting cylinder 54 intercepts the lower or rearward end of each loaf as it falls downwardly toward the receiver 52 and causes it to rotate about a transverse axis thereof into substantially an upright position in the receiver, the path taken by the loaf being illustrated by the loaves falling into the receiver in Fig. 1, viewing these loaves from left to right. Thus, as the loaves fall from the pans, they are automatically righted by the cylinder 54, which is an important feature of the invention.

The receiver 52

As best shown in Figs. 1, 4 and 5 of the drawings, the receiver 52 is merely a V-shaped trough which extends horizontally across the unloading apparatus at the forward end thereof with the open side of the trough facing upwardly. The loaves of bread land on one wall 243 of the trough-shaped receiver 52 and are held in the receiver by the gate 55, which forms the other wall of the receiver, until such time as the gate is opened to permit the loaves to slide onto the cooling conveyor 33.

Loaf straightening means

Referring particularly to Figs. 3, 4 and 5 of the drawings, the unloading apparatus includes means for straightening the loaves in the receiver 52 and for moving them into contact with each other before the gate 55 is opened to permit them to slide onto one of the cooling conveyors 33 so that the loaves will occupy a minimum of space on the conveyor. As best shown in Fig. 3, the loaf straightening means comprises a pair of bars 244 and 245 which are adapted to engage the end loaves in the receiver 52 and which are movable toward each other to straighten the loaves and move them into contact with each other. The bars 244 and 245 are mounted on arms 246 and 247, respectively, which are pivotally connected to the frame 61 of the unloader at 248 and 249, respectively. A rod 250 is pivotally connected to the arm 246 forwardly of the pivot point 248, as indicated by the numeral 251, and is pivotally connected to the arm 247 rearwardly of the pivot point 249, as indicated by the numeral 252, so that movement of the rod 250 toward the left, as viewed in Fig. 3 of the drawings, causes the arms 246 and 247 to rotate in opposite directions to move the bars 244 and 245 toward each other, thereby straightening and compacting a series of loaves in the receiver 52.

As best shown in Fig. 3 of the drawings, the rod 250 is pivotally connected to a lever 256 at 257, the lever being pivotally connected to the frame 61 of the unloader intermediate its ends at 258. It will be apparent that rotation of the lever 256 in the clockwise direction, as viewed in Fig. 3 of the drawings, will move the rod 250 to the left to move the bars 244 and 245 together in the foregoing manner. The lever 256 is controlled by a cam 259 which engages a cam follower 260 on the lever, the cam being adapted to actuate the lever to move the bars 244 and 245 together and then apart again as it rotates through one revolution.

The cam 259 is connected to a single revolution clutch 263 which is carried by a shaft 264 mounted on the frame 61 of the unloader. As best shown in Fig. 5 of the drawings, the clutch 263 is adapted to be driven by a chain 265 which is trained over a sprocket 266 connected to the clutch and a sprocket 267 fixed on a jack shaft 81. The jack shaft 81 can be driven in any suitable or conventional manner, but in the embodiment shown it is driven by an electric motor 68 having a speed varying pulley 69 mounted on its shaft. The pulley 69 is adapted to receive a V belt 70 which is trained thereover and over a pulley 71, the latter being rotatably mounted on the outer end of one arm of a bell crank 72 which is rotatably mounted on a shaft 73. The speed-varying pulley 69 is of conventional design and need not be described in detail herein. It will be understood that as the bell crank 72 is rotated about its shaft 73 to move the pulley 71 toward and away from the speed-varying pulley 69, the latter varies the ratio of the rotational speeds of the pulleys 69 and 71.

The pulley 71 is connected to and drives a pulley 76 which is also rotatably mounted on the outer end of the arm of the bell crank 72 which carries the pulley 71. Aligned with the pulley 76 is a pulley 77 which is fixed on the shaft 73, the pulley 77 being driven by the pulley 76 through a V belt 78.

The shaft 73 extends into a gear box 79 and drives a shaft 80 through suitable gearing (not shown) contained in the gear box. The shaft 80 drives the horizontal jack shaft 81 through a chain 82 trained over sprockets 83 and 84 which are fixed on the shafts 80 and 81 respectively.

The various sections of the unloader conveyer 37 are driven from the jackshaft 81 in any suitable or conventional manner.

Considering the drive for the fast rollers 45 and referring particularly to Figs. 4 and 7 of the drawings, the fast rollers are driven by a chain 108 which is trained over a sprocket 109 on the jackshaft 81 and a sprocket 110 on one of the fast rollers, the ratio of the diameters of the sprockets 109 and 110 being such as to provide the desired speed for the fast rollers. As is the case with the slow rollers 43, the fast rollers 45 are all geared together so that they are all driven by the sprocket 110. The clutch 263 is controlled by a solenoid 268 which is adapted to lift a pivoted catch 269 to engage the clutch when the solenoid is energized in a manner to be described in more detail hereinafter. Thus, whenever the solenoid 268 is energized to engage the clutch 263, the latter rotates the cam 259 through a single revolution to move the bars 244 and 245 together to compact a series of loaves in the receiver 52 and to subsequently move the bars apart again into their original positions.

The receiver gate 55

As best shown in Fig. 5 of the drawings, a cam 272 for controlling the receiver gate 55 is connected to the single revolution clutch 263, the gate 55 being carried by a shaft 273 and being rotatable from a closed position downwardly into an open position wherein it is inclined downwardly toward the cooling conveyor 33 to permit the loaves of bread in the receiver 52 to slide onto the cooling conveyor. Fixed on one end of the shaft 273 is an arm 274 to which a member 275 is pivotally connected, the member 275 having thereon a cam follower 276 which engages the cam 272. The member 275 is supported by a brace 277 which is pivotally connected to the member 275 at the point of connection of the cam follower 276 thereto, and which is pivotally connected to the frame 61 of the unloading apparatus at 278.

When the single revolution clutch 263 is disengaged, the cam 272 occupies the position shown in Fig. 5 of the drawings and acts through the member 275, the arm 274 and the shaft 273 to hold the receiver gate 55 in its closed position. When the solenoid 268 controlling the single revolution clutch 263 is energized to permit engagement of the clutch, the latter rotates the cam 272 in the counterclockwise direction, as viewed in Fig. 5 of the drawings, to permit the gate 55 to rotate into its open position under the influence of gravity. As the clutch 263 completes its single revolution, the cam 272 returns the gate 55 to its closed position.

Thus, the solenoid 268 controls the operation of the loaf straightening means and the receiver gate 55. The manner in which the solenoid 268 is energized to operate the loaf straightening means and open the receiver gate at the proper moments in the operating cycle of the unloading apparatus will be considered in more detail hereinafter in connection with the discussion of the electric control system for the apparatus.

The cooling conveyor 33

As best shown in Fig. 1 of the drawings, the cooling conveyor 33 is merely an endless conveyor which moves transversely of the unloading apparatus and which may be driven in any suitable manner not specifically shown in the drawings. The conveyor 33 is located beneath and forwardly of the receiver 52 in a position to receive the loaves of bread in the receiver 52 when the gate 55 of the latter is opened to permit the loaves of bread to slide therefrom. The conveyor 33 may lead to a suitable point of storage for cooling the loaves, or may form part of a long conveyor on which the loaves remain until cool, as is well known in the art.

The pan strap conveyor 32

As best shown in Figs. 1 and 5 of the drawings, the pan strap conveyor 32 extends horizontally across the unloading apparatus 21 in a position to receive the empty pan straps as they slide from the table 160 of the dumping structure 51 as the latter rotates into its second dumping position 51″. When the dumping structure 51 is in its second dumping position, the table 160 registers with an inclined plate 293 over which the empty pan straps may slide from the table onto the conveyor 32.

The pan strap conveyor is of the endless type and is driven from the jack shaft 81 as best shown in Figs. 4 and 6 of the drawings. Fixed on the jack shaft 81 is a sprocket 294 which is aligned with a sprocket 295 fixed on a shaft leading into a gear box 296, the sprockets 294 and 295 being connected by a chain 297 trained thereover. The conveyor 32 is driven from the gear box 296 by a shaft 298, as best shown in Fig. 4 of the drawings.

The conveyor 32 may move the empty pan straps to a suitable point of storage, or may connect with another conveyor (not shown) for returning the straps to the inlet end of the oven for refilling with bread dough.

Prior to initiating operation of the unloading apparatus 21, the various components of the electrical control system occupy the respective positions shown in Figs. 16 and 17 of the drawings. In order to initiate operation of the apparatus, it is merely necessary to close the line switch LS and then momentarily close the starting switch 315. This establishes a closed circuit through the master relay 304 to energize the latter, whereupon it closes the switches 304a to 304d. The switch 304a controlled by the relay 304 is connected in parallel with the starting switch 315 therewith so that the relay 304 holds when the starting switch is opened. Thus, the starting switch need be closed only momentarily. The switch 304b is connected in series with the motor 68 for driving the unloader conveyor 37 and its appurtenances including the shaft 264 which drives the loaf compacting means and the cam 272 which permits the gate 55 to open. Thus, closure of the switch 304b by the relay 304 starts the unloader conveyor 37. The switch 304d is connected in series with the oven drive motor (not shown) so that when this switch is closed by the relay 304, the oven conveyor (not shown) is started. Closure of the switch 304c by the relay 304 prepares the dumping motor 168 for energization since the switch 304c is connected in series therewith, and the switch 306a of the time-delay relay 306 will subsequently close to render the starting of motor 168 subject to closure of switch 301b. Thus, when the operator closes the starting switch 315 to energize the relay 304, the latter holds, starts the oven conveyor and the unloader conveyor 37 and prepares the dumping motor 168 for subsequent energization.

The line of pan straps 27 is moved toward the gate 50 at the outlet end of the unloader conveyor 37 by the fast rollers 45 and is intercepted by this gate. When a predetermined number of the pan straps in the line engage the gate 50, the force applied to the gate causes the latter to close the switch 153 and energize the solenoid 150 through the now closed switches 301c and 173. When the solenoid 150 is energized in this manner, it engages the single revolution clutch 146 so that the latter drives the cam 145 through one revolution to open and subsequently close the gate 50, the line of pan straps intercepted by the gate moving onto the dumping structure 51 in the interim.

The solenoid 268 is energized concurrently with solenoid 150 to engage the single revolution clutch 263. The latter then drives the cam 259 through one revolution to cause the bars 244 and 245 to straighten and compact a previously dumped series of loaves in the receiver 52. Simultaneously, the clutch 263 drives the cam 272 through a single revolution to open and subsequently close the gate 55 of the receiver 52, the loaves of bread sliding from the receiver onto the conveyer 33. The two cams 259 and 272 are so designed and so arranged with respect to each other that the straightening bars 244 and 245 disengage the loaves of bread in the receiver 52 before the gate 55 opens to permit the loaves to slide onto the conveyer 33.

Reverting to the single revolution clutch 146 controlling the pan strap gate 50, as this clutch completes its single revolution and closes the gate 50 after the line of pan straps 27 has moved onto the dumping structure 51, the arm 156 acts to momentarily close the switch 157. The switch 157 is connected in series with the relay 301. Thus, closure of the switch 157 results in energization of the relay 301. The switch 301a controlled by the relay 301 is connected in series therewith and is also connected in series with the normally closed switch 173. Consequently, the switch 301a serves to hold the relay 301 once it is energized by momentary closure of the switch 157 in the foregoing manner. The relay 301 controls the dumping cycle of the unloading apparatus, i. e., it controls the operation of the dumping structure 51, in a manner about to be described.

When the relay 301 is energized in the foregoing manner, it opens the switch 301c controlled thereby so as to prevent re-energization of the solenoid 150 controlling the pan strap gate 50, it being appreciated that the switch 153 previously opened during operation of the gate 50. This prevents opening of the gate 50 to admit another line of pan straps to the dumping station 38 while a preceding line of pan straps is being dumped, which is an important feature. When energized, the relay 301 also closes the switch 301b which is connected in series with the dumping motor 168 through the switch 304c, the latter being held closed by the relay 304 as previously discussed. Under the conditions prevailing at this point in the operating cycle of the apparatus, the reversing switch 172 controlling the direction of rotation of the dumping motor 168 is in a position to connect the contacts 172b together and the contacts 172a together. Consequently, when the switch 301b closes, the dumping motor 168 will rotate the dumping structure 51 from its loading position to its first dumping position 51'. When the dumping structure 51 reaches its first dumping position, the loaves of bread are dumped from the pans 25 into the receiver 52 in the manner previously described.

As the dumping structure 51 reaches its first dumping position 51', the cam 171 actuates the reversing switch 172 to connect the contacts 172a with their respective contacts 172b, thereby reversing the direction of rotation of the dumping motor 168. The latter then reverses the direction of rotation of the dumping structure 51 and moves it from its first dumping position through its loading position to its second dumping position 51''. When the dumping structure 51 reaches its second dumping position, the cam 171 again actuates the reversing switch 172 to reconnect the contacts 172b together and contacts 172a together preparatory to rotating the dumping structure from its second dumping position back to its loading position. When the contacts of the reversing switch 172 are reconnected in this manner, it will be noted that a circuit through the delaying relay 306 was broken and reestablished. After the lapse of a predetermined time interval sufficient to permit the empty pan straps to slide from the dumping structure 51 onto the strap conveyer 32, the delaying relay 306 closes the switch 306a controlled thereby to energize the dumping motor 168 for forward rotation so that it returns the dumping structure from its second dumping position to its loading position. The provision of such a time delay is an important feature of our invention since it insures movement of the empty pan straps from the dumping structure onto the strap conveyer 32 before rotation of the dumping structure back toward its loading position is initiated.

It should be pointed out that, prior to the initiation of the dumping cycle, the reversing switch 172 was in a position to connect the contacts 172a together and the contacts 172b together so that the delaying relay 306 was already energized when the switch 301b was closed to initiate forward rotation of the dumping motor 168. Consequently, the relay 306 interposed no time delay at the beginning of the dumping cycle.

As the dumping structure 51 arrives back at its loading position, the cam 171 acts through the cruciform member 178 to open the limit switch 173 momentarily. The switch 173, as previously mentioned, is connected in series with the switch 301a holding the relay 301 energized so that this relay is de-energized when the dumping structure is returned to its loading position. De-energization of the relay 301 results in opening of the switch 301b connected in series with the dumping motor 168 to stop the dumping motor. Also, when the relay 301 is de-energized, the switch 301a controlled thereby opens to prevent re-energization of the relay 301 upon reclosing of the limit switch 173. Thus, the limit switch 173 serves to stop the dumping motor 168 at the end of the dumping cycle. The switch 316 is connected in series with the master relay 304 and may be opened manually to stop the operation of the unloading apparatus and the oven with which it is associated. Thus, if an emergency necessitating a shut down of the oven and the unloader arises, it is merely necessary to open the switch 316 momentarily.

We claim as our invention:

1. In an apparatus of the character described, the combination of: a dumping structure pivotable between a loading position and a dumping position; means on said dumping structure for holding a container to be dumped; means including a normally engaged clutch for rotating said dumping structure toward said dumping position; resilient means biasing said dumping structure toward said dumping position; stop means disposed in the path of said dumping structure for terminating rotation of said dumping structure as it reaches said dumping position; and means for disengaging said clutch as said dumping structure approaches said dumping position, whereby said resilient means causes said dumping structure to strike said stop means so as to loosen the contents of the container being dumped.

2. An apparatus as set forth in claim 1 including means for shifting said clutch disengaging means relative to said stop means.

3. In an apparatus of the character described for dumping the contents of a container, the combination of: a frame; a table adapted to receive a container to be dumped, said table being carried by said frame and being pivotable relative thereto about a substantially horizontal axis; means for rotating said table from a loading position wherein it is inclined upwardly away from said axis of rotation to a first dumping position wherein it is also inclined upwardly away from said axis of rotation, and for subsequently rotating said table from said first dumping position through said loading position to a second dumping position wherein it is inclined downwardly away from said axis of rotation; holding means carried by said table and including an element which is movable from a retracted position to an extended position into engagement with a container on said table; means for moving said element from its retracted position to its extended position as said table is rotated from said loading position toward said first dumping position; and means for moving said element from said extended position to said retracted position as said table is rotated toward said second dumping position.

4. An apparatus as set forth in claim 3 wherein said means for moving said element from its retracted position to its extended position and said means for moving said element from its extended position to its retracted position comprise cooperating cam elements carried by said table and said frame.

5. In an apparatus for dumping the contents of a container, the combination of: a frame; a table carried by said frame and adapted to receive a container to be dumped, said table being pivotable relative to said frame about a substantially horizontal axis; means for first rotating said table from a loading position wherein it is inclined upwardly from said axis of rotation to a first dumping position wherein it is also inclined upwardly from said axis of rotation, for subsequently rotating said table from said first dumping position through said loading position to a second dumping position wherein it is inclined downwardly away from said axis of rotation, and for thereafter rotating said table from said second dumping position back to said loading position; energizable, container-holding means carried by said table operable to engage or release said container; means for engaging said holding means as said table is rotated toward said first dumping position; means for releasing said holding means from said container as said table is rotated toward said second dumping position; and delaying means for interrupting the operation of said table rotating means for a predetermined interval when said table is in said second dumping position to allow time for a container on said table to slide therefrom.

6. In an apparatus for dumping the contents of a container, the combination of: a movable dumping structure adapted to receive a container the content of which is to be dumped therefrom; means carried by said dumping structure for holding a container to be dumped, said holding means including a plurality of gripping elements which are collectively movable relative to said dumping structure into a collective extended position and which are individually movable relative to said dumping structure and relative to each other into individual extended positions, said gripping elements, when extended, being adapted to engage a container on said dumping structure; resilient means for collectively biasing said gripping elements toward said collective extended position; means for individually biasing said gripping elements toward their respective individual extended positions; and means for rotating said dumping structure to a position to dump the content of a container thereon.

7. In an apparatus for dumping the contents of a container, the combination of: a frame; a dumping structure carried by and pivotable relative to said frame and adapted to receive a container whose contents are to be dumped therefrom; a first gripping structure carried by said dumping structure and adapted to engage one side of the container to be dumped; a second gripping structure carried by said dumping structure and adapted to engage the opposite side of the container to be dumped, said second gripping structure including a plurality of pivoted gripping elements and being rotatable relative to said dumping structure into a closed position wherein said gripping elements are adapted to engage said opposite side of the container; resilient means for biasing said second gripping structure toward said closed position; resilient means operatvely connected to each of said gripping elements for individually urging said elements into engagement with said opposite side of the container to be dumped; and means for rotating said dumping structure into a position to dump the contents of the container held by said gripping structures.

8. In an apparatus of the character described, the combination of: means for simultaneously dumping a plurality of loaves of bread from pans in which the loaves have been baked, said dumping means being adapted to receive the pans in side-by-side relationship so that the loaves of bread fall from the pans in side-by-side relationship when dumped therefrom by said dumping means; a receiver located adjacent and below said dumping means and adapted to receive the loaves of bread dumped from the pans by said dumping means in side-by-side relationship; compacting means having arms at opposite ends of the receiver movable relative to each other and against loaves of bread in said receiver to push said loaves into contact with each other; and means for actuating the arms of said compacting means.

9. An apparatus as set forth in claim 8 wherein said receiver for the loaves of bread is provided with a normally closed gate, said gate being movable to an open position by said means for actuating said compacting means.

10. In an apparatus of the character described for dumping the contents of a container, the combination of a table pivotable about a horizontal axis having a container supporting member provided with an opening therein; means for rotating said table between a loading position and a dumping position; holding means carried by the table engageable with a container on the supporting member of said table, said holding means including a gripping element, and a pivotal mounting for said element disposed below said supporting member, said gripping element being movable from a retracted position below said supporting member upwardly through the opening therein to a position above said supporting member for engagement with a container disposed thereon; resilient means coactive with said holding means urging the gripping element to the latter position for engagement with a container; a lever pivotally coactive with said gripping element; and cam means positioned to engage the lever when the table is rotated to the dumping position and operative to rock said gripping element to a retracted position below the supporting member of said table against the action of said resilient means.

11. In an apparatus of the character described, the combination of a dumping structure pivotable between a loading position and a dumping position; means on said dumping structure for holding a container to be dumped; means including a normally engaged clutch for rotating said dumping structure toward said dumping position; resilient means biasing said dumping structure toward said dumping position; stop means disposed in the path of said dumping structure for terminating rotation of said dumping structure as it reaches said dumping position; an element movable between two positions, in one of said two positions said element being disposed to engage said clutch as said dumping structure approaches its dumping position and operative by such engagement to disengage the clutch whereby said resilient means causes said dumping structure to strike said stop means so as to loosen the contents of the container being dumped, in the other of said two positions said element being disposed out of the path of travel of said clutch so as to render said resilient means inoperative for the purpose described; and means for moving said element between said two positions.

12. In an apparatus of the character described, a receiver; a dumping structure adapted to deliver loaves of bread in side-by-side relationship to said receiver; compacting means having arms at opposite ends of the receiver movable relative to each other and against loaves of bread in the receiver to compact said loaves of bread in said receiver; means including a single revolution clutch for actuating the arms of said compacting means; and means operable in timed relation with said dumping structure for engaging said clutch.

13. In an apparatus of the character described, a receiver; a dumping structure adapted to deliver loaves of bread in side-by-side relationship to the receiver; a conveyer positioned to receive loaves of bread from said receiver; compacting means having arms at opposite ends of the receiver movable relative to each other and against loaves of bread in the receiver to compact said loaves of bread; a gate on the receiver normally closed to hold said loaves of bread thereon for engagement by said compacting means and movable to an open position for releasing said loaves of bread so as to permit delivery thereof to said conveyer; and means for actuating said compacting means and said gate in timed relation whereby the loaves of bread are compacted in the receiver and the gate is thereafter opened to deliver the same to said conveyer.

14. In an apparatus of the character described, a receiver; a dumping structure adapted to deliver loaves of bread in side-by-side relationship to said receiver; a conveyer arranged to receive loaves of bread from the receiver; compacting means engageable with loaves of bread in the receiver and operable to compact the same therein; a pivoted gate on the receiver normally positioning the loaves of bread for engagement by said compacting means and holding said loaves of bread on the receiver; actuator means for said compacting means; a separate actuator means for moving said gate between open and closed positions; and a single drive mechanism for both of said actuator means operable by said dumping structure for actuating said compacting means and said gate in mutually timed relation once for each operation of said dumping structure.

15. Apparatus for dumping the contents of multiple strapped bread pans and the like delivered by one conveyer onto a second conveyer and for thereafter delivering the empty pans to a third conveyer comprising dumping means positioned to receive multiple strapped pans containing loaves of bread from said first conveyer and operable to first dump the loaves of bread from the pans and thereafter to deliver the empty pans to said third conveyer, means associated with said dumping means for releasably holding said pans during said dumping operation and operable to release said pans before delivery thereof to said third conveyer, a receiver positioned to receive the loaves of bread dumped from the pans, means associated with the receiver for arresting movement of the loaves and positioning the loaves in a predetermined relative position thereon, and means operable to cause discharge of the positioned loaves of bread simultaneously on said second conveyer.

16. Apparatus for receiving multiple strapped bread pans containing loaves of bread from one conveyer, dumping the loaves of bread from the pans for delivery to a second conveyer and then delivering the empty pans to a third conveyer comprising a pivotable dumping means normally positioned to receive multiple strapped pans containing loaves of bread from said first conveyer, drive means connected to said dumping means for rotating the same first in one direction to dump the loaves of bread from the pans and for thereafter rotating said dumping means in a reverse direction from said dumping position through the normal loading position to a second dumping position preparatory to delivery of the empty pans to said third conveyer, means associated with said dumping means for releasably holding the pans on the dumping means during dumping of the loaves from said pans, means for disengaging said holding means from said pans during reverse rotation of said dumping means and before the latter reaches said second dumping position, a receiver for receiving the dumped loaves of bread, means associated with the receiver for arresting movement of the loaves and positioning the loaves in a predetermined relative position thereon, and means operable thereafter to cause discharge of the positioned loaves simultaneously on said second conveyer.

17. Apparatus for dumping the contents of multiple strapped bread pans and the like on a moving conveyer comprising dumping means for holding multiple strapped pans and dumping the contents thereof, a receiver for receiving the dumped articles, a pivoted gate on the receiver normally retaining the articles on the receiver and movable to release said articles and thus cause discharge thereof onto a moving conveyer, compacting means having spaced arms extending into the receiver and movable relative to each other and against articles in the receiver to compact the same, and actuator means connected to said dumping structure and said compacting means and said gate for operating the same successively in timed relation.

18. In combination a conveyer for delivering filled containers to a container dumping mechanism, a pair of horizontally spaced conveyers positioned at lower levels than the discharge end of the first conveyer, a dumping mechanism comprising a supporting member pivotable about a horizontal axis and having a supporting surface which is inclined upwardly and toward the discharge end of the first conveyer when the member is in its loading position, means for rotating said supporting member about said axis in the direction which increases the upward inclination of said surface to dump the contents of said containers on one of said pair of conveyers, means to rotate said supporting member about said axis in the opposite direction to a pan discharging position beyond said loading position and in which said surface inclines downwardly in a direction extending below the discharge end of the first conveyer to discharge the empty container on the other of said pair of conveyers, means on said dumping mechanism engageable with the container to hold the same on said surface of the supporting member of the dumping mechanism, means for actuating said holding means to engage the same with the container as said supporting member is rotated toward said first dumping position, and means for disengaging said holding means from said container as said dumping structure is rotated toward said empty container discharging position.

HIRAM E. TEMPLE.
GEORGE E. TENCH.

REFERENCES CITED

The following references are of record in the file of this patent:

UNITED STATES PATENTS

| Number | Name | Date |
|---|---|---|
| 1,295,195 | Parker | Feb. 25, 1919 |
| 1,473,996 | McGarry | Nov. 3, 1923 |
| 1,561,664 | Rathwell | Nov. 17, 1925 |
| 1,575,282 | Schiff | Mar. 2, 1926 |
| 1,655,801 | Strauss | Jan. 10, 1928 |
| 1,673,283 | Hatton | July 12, 1928 |
| 1,752,540 | Olson | Apr. 1, 1930 |
| 1,861,634 | Lathrop | June 7, 1932 |
| 1,883,426 | Walter | Oct. 18, 1932 |
| 1,914,779 | Libby | June 20, 1933 |
| 1,976,855 | McKee | Oct. 16, 1934 |
| 2,125,654 | Schiff | Aug. 2, 1938 |
| 2,160,557 | Odell | May 30, 1939 |
| 2,344,664 | Adams | Mar. 21, 1944 |
| 2,349,968 | Kampfer | May 30, 1944 |
| 2,377,294 | Belada et al. | May 29, 1945 |
| 2,409,121 | Fritschle | Oct. 8, 1946 |
| 2,424,252 | Orlando | July 22, 1947 |
| 2,459,204 | Van Vleck | Jan. 18, 1949 |
| 2,462,021 | Harker | Feb. 15, 1949 |
| 2,508,698 | Von Beren | May 23, 1950 |
| 2,524,656 | Eyster | Oct. 3, 1950 |